(No Model.)
W. R. WEBSTER.
APPARATUS FOR UPSETTING EYE BARS.
No. 406,552. Patented July 9, 1889.
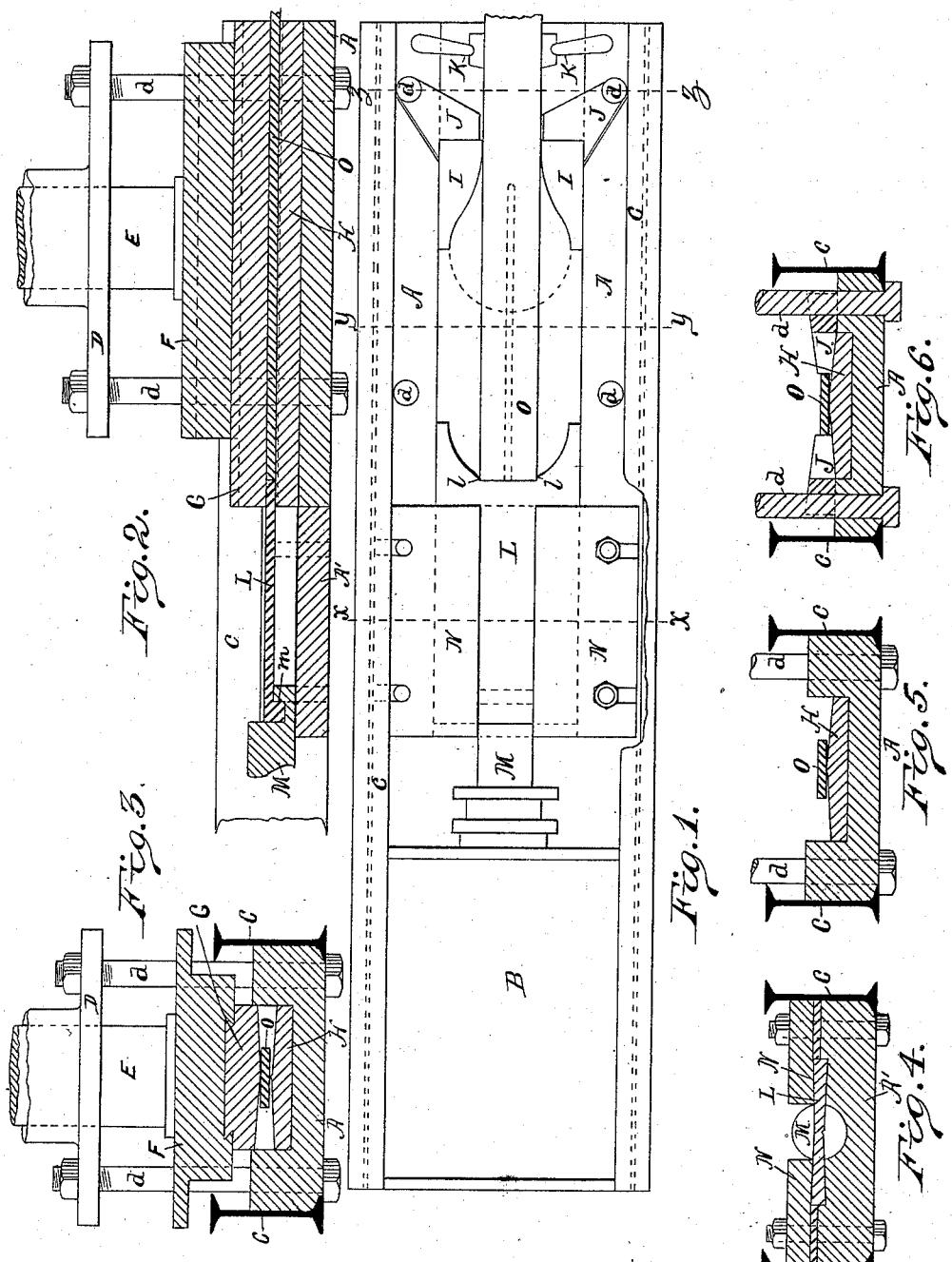

UNITED STATES PATENT OFFICE.

WILLIAM R. WEBSTER, OF PHILADELPHIA, PENNSYLVANIA.

APPARATUS FOR UPSETTING EYE-BARS.

SPECIFICATION forming part of Letters Patent No. 406,552, dated July 9, 1889.

Application filed April 22, 1889. Serial No. 308,065. (No model.)

*To all whom it may concern:*

Be it known that I, WILLIAM R. WEBSTER, of the city and county of Philadelphia, State of Pennsylvania, have invented a new and useful Improvement in Apparatus for Upsetting Eye-Bars, of which the following is a true and exact description, reference being had to the accompanying drawings, which form a part of this specification.

My invention relates to the apparatus used in manufacturing eye-bars by upsetting the ends of bars to form the heads in which the eyes or pin-holes are formed; and the object of my improvement is, in the first place, to provide an apparatus offering the minimum of frictional resistance to the upsetting of the bars; in the second place, to provide a novel device for preventing the upsetting-plunger from bending or breaking; thirdly, to provide a device for preventing the end of a bar from deflecting sidewise during the early stages of the upsetting action, and, fourthly, to simplify and strengthen the machine.

These novel features of my invention will be best understood after a description of the drawings, in which they are illustrated, and will be hereinafter pointed out in the claims.

Reference being now had to the drawings, Figure 1 is a plan view of an upsetting apparatus embodying my improvement and having the upper die and upper part of the housing removed. Fig. 2 is a central longitudinal elevation of the apparatus with the upper parts restored and the hydraulic cylinder omitted. Fig. 3 is a cross-section on the line $y\ y$, Fig. 5, showing the same section with the upper die and housing removed. Fig. 4 is a section on the line $x\ x$; and Fig. 6, a section on the line $z\ z$, with the upper parts removed, as in Fig. 5.

A is the base-plate supporting the lower die. As shown, it is formed with a longitudinal cavity to receive and guide a sliding lower die H.

A' is a base-plate for supporting the plunger. Its upper surface is formed to receive and conform to the lower surface and sides of the plunger L, and the ram M and plates N N are bolted to it, so as to fit over the sides of the plunger, which extend beyond the ram M.

B is the cylinder which actuates the ram M. A hydraulic cylinder is generally used; but steam or air may be employed, if desired.

C C are eye-beams, which extend along the sides of cylinder B and the base-casting of the die-housing, binding the two together and strengthening the apparatus by a very simple construction.

D is the upper fixed portion of the housing, secured to the lower fixed portion A by strong bolts or columns $d\ d$, &c.

E is the ram of a device (not shown) for raising, lowering, and holding down the upper die. It is directly attached to a plate or casting F, in which, as shown, are formed guides to engage and direct a movable upper die G.

H is the lower die, sliding, as already noted, in the base-plate A.

I I are the adjustable cheek-pieces, which, in cases where the lower die is stationary, are usually secured to it, but which in the present case are supported on brackets J J, secured to base-plate A and columns $d\ d$, as shown, and resting against the sides of the cavity in plate A.

K K are clamps for holding the bar.

L is the upsetting-plunger, formed to work between the upper and lower dies. Its effective surface is given approximately the shape of the outer portion of the head to be formed, and to prevent the bending sidewise or slipping of the end of the bar to be upset I form a slight recess (indicated at $l\ l$) in the center of the plunger-head, which will receive and hold the end of the bar, as shown, and which of course will prevent it from bending or slipping away from the center. The portion of the plunger which in the beginning of a stroke extends beyond the dies is by my new construction supported in the guides formed by base-plate A' and its flange-plates N N, and the plunger is actuated by the ram M, which is made large enough to resist any tendency to bend under the strains to which it is subjected, and which moves in a cavity formed in plate A' and between guide-plates N N.

O in the drawings represents the bar under treatment.

The different features of my apparatus are obviously capable of separate as well as conjoint use. The combination of one or more sliding dies with a plunger arranged to move between them without actuating either of them results in the movable die or dies sliding only at such times and to such an extent as the action of the metal in the bar being treated may influence it, whereas in dies where the plunger forced one or both die-faces before it the movement of the dies was necessarily independent of the flow of the metal being upset. It will therefore be obvious that my device will afford less frictional resistance to upsetting than the older plans.

The device for supporting the plunger may be considered as an alternative plan to that shown in my patent, No. 400,148, of March 26, 1889.

Having now described my invention, what I claim as new, and desire to secure by Letters Patent, is—

1. In an apparatus for upsetting eye-bars, the combination of one or more sliding dies with an upsetting-plunger arranged to work between the die-faces without engaging them.

2. In an apparatus for upsetting eye-bars, the combination of dies for holding the bar to be upset, an upsetting-plunger arranged to work between said dies, supporting-guides for said plunger, arranged in front of the dies, and a ram arranged to actuate the plunger and work between the said guides.

3. In an apparatus for upsetting eye-bars, the combination of a hydraulic cylinder or its equivalent and the housing of the dies with beams C C, connecting and binding them together, substantially as and for the purpose specified.

4. In an apparatus for upsetting eye-bars, a shaping-plunger having a shallow recess in its center adapted to engage the end of a bar and prevent it from moving sidewise during the early stages of upsetting.

WILLIAM R. WEBSTER.

Witnesses:
LEWIS R. DICK,
FRANCIS T. CHAMBERS.